E. SPRUNG.
STUD EXTRACTOR AND TIGHTENER.
APPLICATION FILED SEPT. 3, 1915.
1,224,801. Patented May 1, 1917.
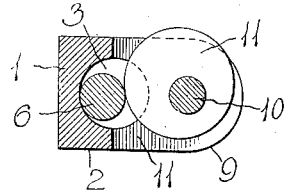
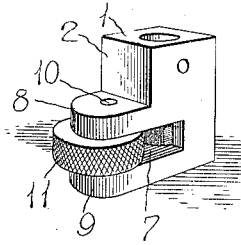
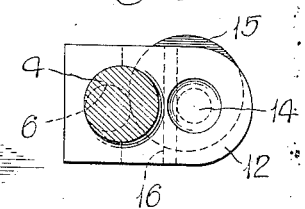
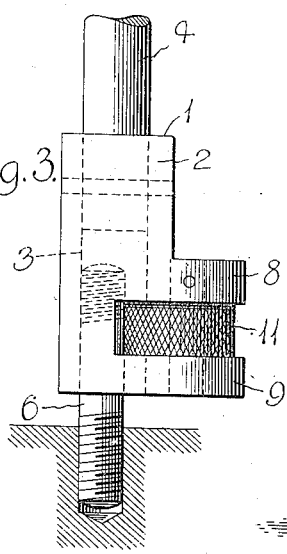
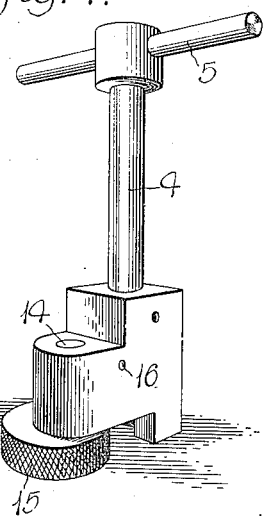
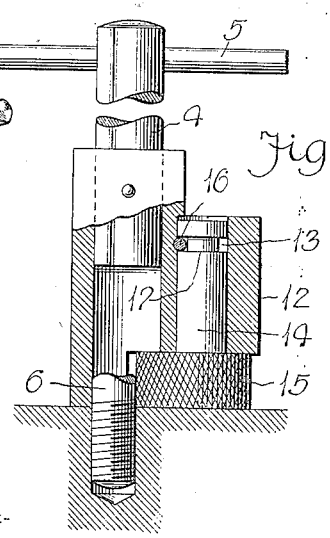
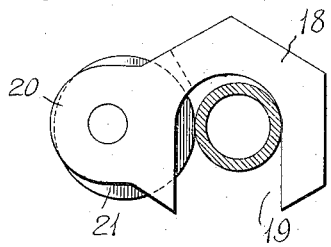
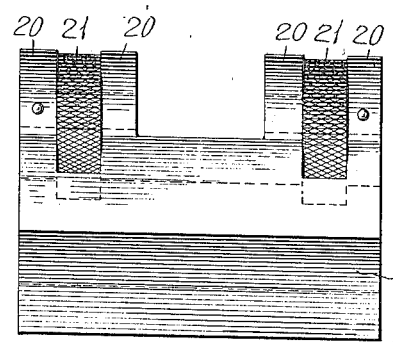
Witnesses
Chas. W. Stauffiger
Karl H. Butler
Inventor
Edmund Sprung,
By Barthel & Barthel
Attorneys

UNITED STATES PATENT OFFICE.

EDMUND SPRUNG, OF DETROIT, MICHIGAN.

STUD EXTRACTOR AND TIGHTENER.

1,224,801.    Specification of Letters Patent.    Patented May 1, 1917.

Application filed September 3, 1915. Serial No. 48,932.

*To all whom it may concern:*

Be it known that I, EDMUND SPRUNG, a citizen of the United States of America, residing at Detroit, in the county of Wayne and State of Michigan, have invented certain new and useful Improvements in Stud Extractors and Tighteners, of which the following is a specification, reference being had therein to the accompanying drawings.

This invention relates to a stud tightener and extractor and as the title indicates, it is a device for tightening or removing stud bolts, but can be just as readily used for rotating pipes or other cylindrical structures by using an ordinary flat-jawed wrench.

The object of my invention is to provide, a simple, durable and inexpensive device of the above type by which a positive grip can be obtained upon a stud bolt to rotate the same, the device being applicable to stud bolts of various diameters and embodies a novel eccentric member, which is adapted to be swung against a stud bolt in the direction the bolt is to be rotated, the eccentric member obtaining a firm purchase upon the stud bolt, whereby the device and said bolt can be moved in synchronism. Such an operation can be expeditiously performed and there is a saving of bolts as the threads of the same are not injured during the removal of the bolt.

With this introduction of a few of the advantages derived by the use of my device, reference will now be had to the drawing showing forms of the device, but it is to be understood that the structural elements shown and hereinafter referred to are susceptible to such changes in size, shape and manner of assemblage, as fall within the scope of the appended claim.

In the drawings,

Figure 1 is a perspective view of one form of device with the handle thereof removed;

Fig. 2 is a horizontal sectional view of the same, showing the eccentric member of the device in engagement with a stud bolt;

Fig. 3 is a side elevation of the same;

Fig. 4 is a perspertive view of another form of device;

Fig. 5 is an enlarged plan of the same, partly in section;

Fig. 6 is a side elevation of the same, partly broken away and partly in section;

Fig. 7 is a side elevation of a further form of the device, and

Fig. 8 is an end view of the same.

Reference will first be had to Figs. 1, 2 and 3 showing a body 1 which is preferably rectangular in order to present flat facets 2 adapted to accommodate an ordinary wrench. The body 1 has a vertically disposed opening 3 and suitably secured in the upper end of the opening is a handle rod 4 provided with a suitable handle 5, which permits of the device being easily carried and placed in position. The lower end of the opening 3 is of sufficient diameter to receive stud bolts of various sizes and to place the device in use, the body 1 is placed over the end of a stud bolt 6, as best shown in Fig. 3.

One side of the body 1 at the lower end thereof, is provided with an enlargement and said enlargement is horizontally slotted or bifurcated, as at 7 to provide vertically alining ears 8 and 9. These ears are apertured to accommodate a pin 10. The slot or bifurcation is of sufficient depth to enter the body 1 and intersect the opening 3 thereof, and in the bifurcation is a knurled gripping member 11 eccentrically and loosely disposed upon the pin 10, whereby it can be swung into engagement with a stud bolt extending into the opening 3 of the body 1.

In order that an eccentric gripping member can be placed in engagement with a stud bolt which only protrudes a fractional part of an inch from its support, the apertured lug 9 is dispensed with, as shown in Figs. 4, 5 and 6, and an enlargement 12 provided with a vertical bore 13 for the stem 14 of an eccentric gripping member 15. The member 15 is located at the lower end of the enlargement 12 and the stem 14 of said member is rotatably retained within the bore 13 by a pin 16 extending through a groove 17 in the stem 14. With this form of device the body can be placed over the end of a stud bolt to rest upon the support of the bolt while the eccentric gripping member 15 is swung into engagement with the bolt and the device rotated to remove the bolt.

Another form of device is shown in Figs. 7 and 8 wherein a hexagonal body 18 is slotted, as at 19 to receive a stud bolt or a pipe, and one of the facets of the body is provided with sets of apertured lugs 20 at the ends of the body. Between the lugs of each set is an eccentric knurled gripping member 21 and the members of this device can be swung into engagement with a stud bolt or pipe to obtain a firm purchase thereon preparatory to rotating the device to remove or tighten the stud bolt or pipe.

What I claim is:—

A device of the type described, comprising a body having facets, said body having a longitudinal slot therein with the walls of said slot parallel with the facets of said body and the bottom of said slot semi-cylindrical relative to the longitudinal axis of said body, sets of parallel apertured lugs carried by one of the facets of said body and spaced apart thereon, the spaces between the lugs of each set being in open communication with the slot of said body, and of a knurled gripping member pivoted between the lugs of each set, and adapted to be swung into the slot of said body.

In testimony whereof I affix my signature in presence of two witnesses.

EDMUND SPRUNG.

Witnesses:
OTTO F. BARTHEL,
G. E. McGRANN.